July 14, 1970          J. R. CALVIN          3,520,287

EXHAUST VALVE CONTROL FOR ENGINE BRAKING SYSTEM

Filed Aug. 9, 1968          3 Sheets-Sheet 1

INVENTOR:
John R. Calvin

ATTORNEYS

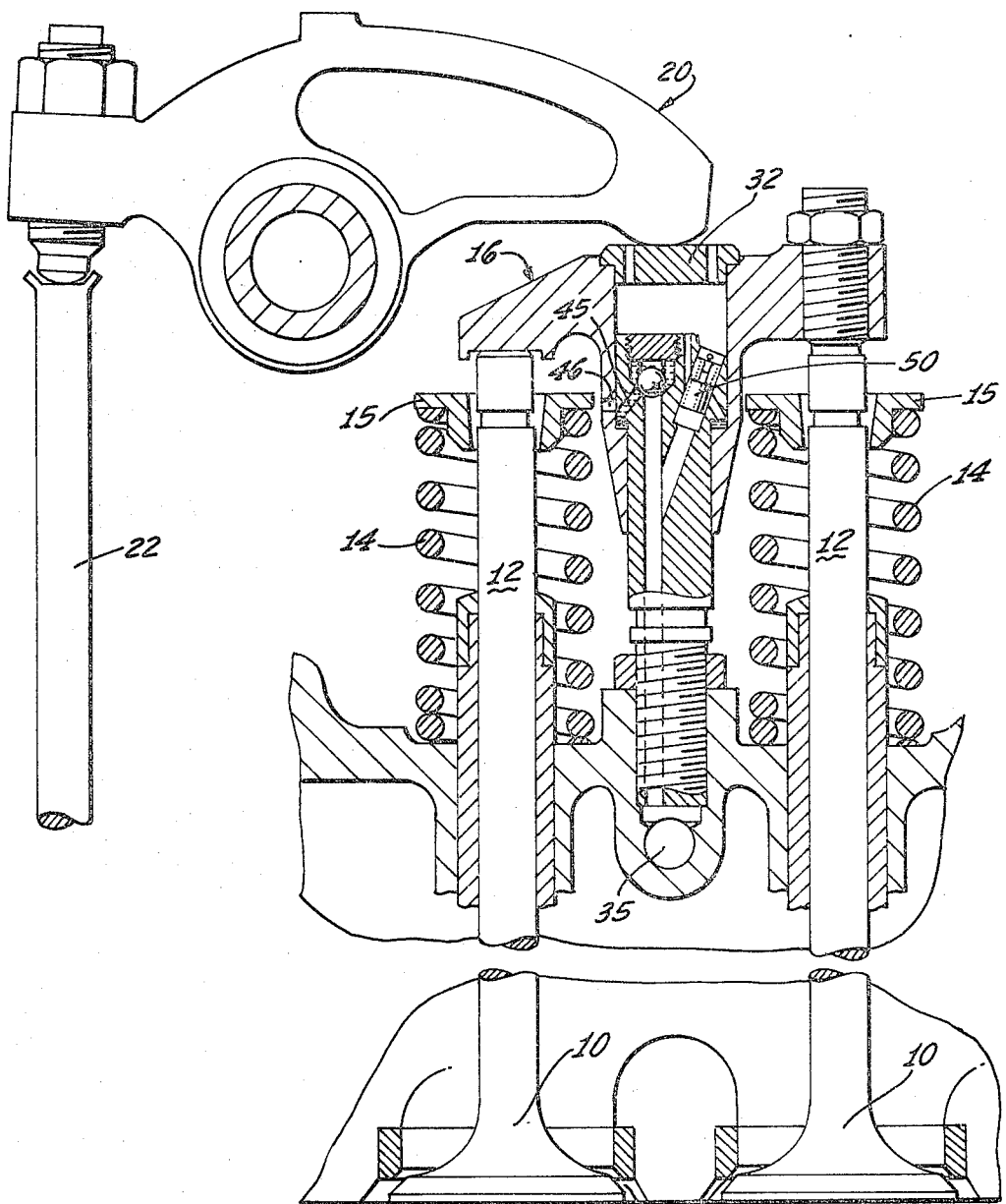

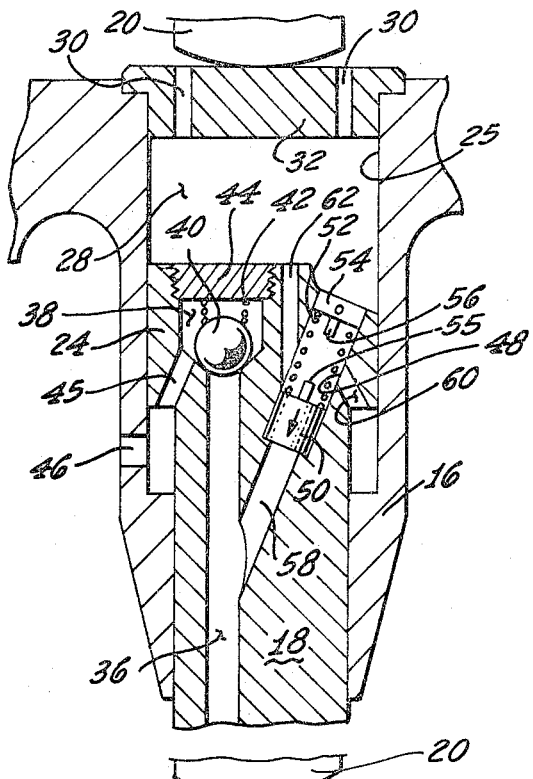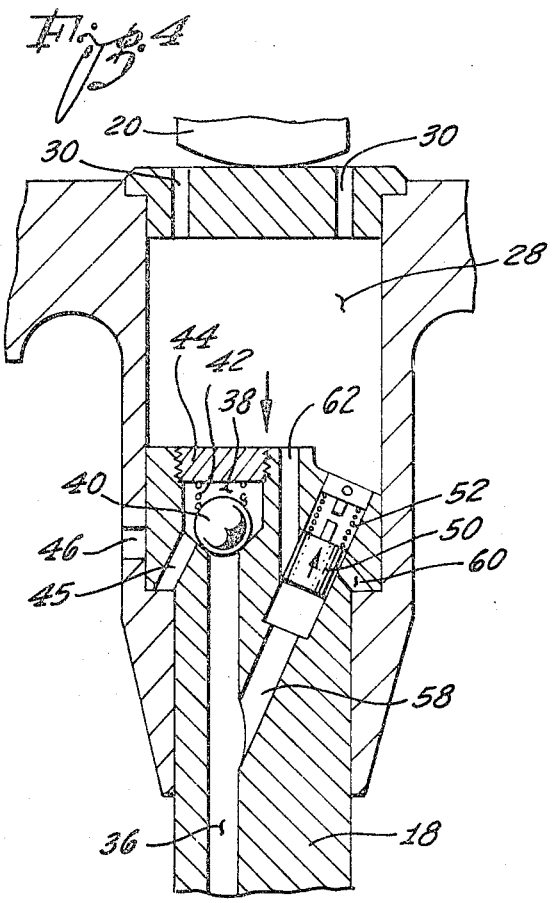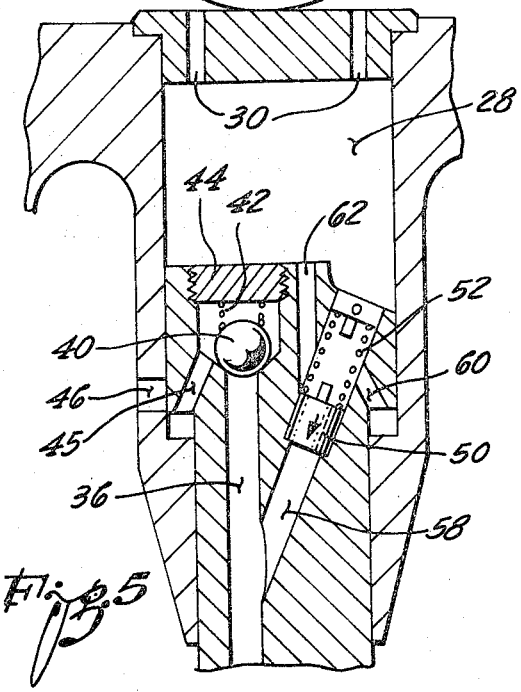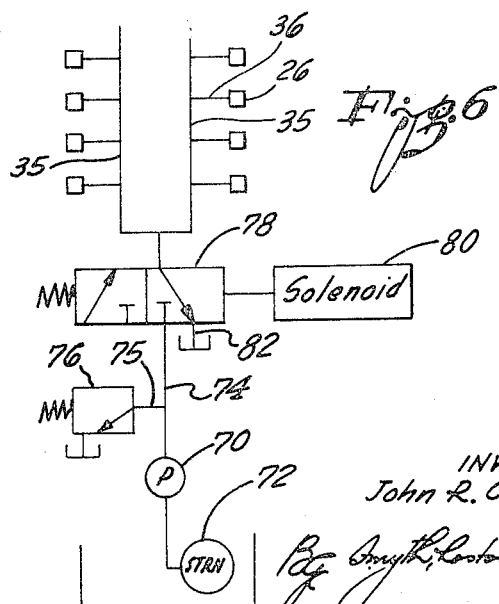

United States Patent Office 3,520,287
Patented July 14, 1970

3,520,287
EXHAUST VALVE CONTROL FOR ENGINE BRAKING SYSTEM
John R. Calvin, Palos Verdes Peninsula, Calif., assignor to White Motor Corporation, Cleveland, Ohio, a corporation of Ohio
Filed Aug. 9, 1968, Ser. No. 751,539
Int. Cl. F02d *13/04, 13/06*
U.S. Cl. 123—97          10 Claims

ABSTRACT OF THE DISCLOSURE

Each cylinder of an internal combustion engine, using a four valve head, has a pair of exhaust valves operated in unison by reciprocation of a valve bridge that is slidingly mounted on a fixed guide post, the valve bridge being operated by a cam-actuated rocker arm in the usual manner. The reciprocative bridge and the guide post cooperate to form a hydraulic chamber that expands when the valve bridge advances to open the two exhaust valves and contracts when the valve bridge retracts to permit the exhaust valves to be closed by the exhaust valve springs. To cause the engine to operate as a power-absorbing compressor for braking action, sufficient fluid is trapped in the various hydraulic chambers to prevent complete contraction of the chambers and thereby prevent complete closing of the various exhaust valves.

BACKGROUND OF THE INVENTION

It is old in the art to employ an internal combustion engine as brake means by, in effect, converting the engine temporarily into a compressor. It is well known that such conversion may be carried out by cutting off the fuel and advancing the operation of the exhaust valves of the engine 180° relative to the rotation of the crank shaft to cause the exhaust valves to open at or near the ends of the compression strokes of the pistons. A disclosure of a control system for this purpose is found in the Cummins Pat. 3,220,392.

A more recent development is retardation of an internal combustion engine by simply holding either all of the exhaust valves or all of the intake valves at least partially open continuously throughout a braking period. This concept is an advance in the direction of simplification in that it eliminates the need for cyclically opening the valves during the braking operation. All that is needed is to block the closing movement of the various valves after they are opened.

A problem arises in that at any given moment some of the valves may be completely closed, some of the valves may be completely opened and the rest of the valves may be in the act of opening or the act of closing. Consequently, if a plurality of means is provided to block the closing movements of the valves, the blocking means must be moved to their blocking positions in sequence and the particular sequence that is required depends on the particular point in the normal engine cycle at which the braking action is initiated.

Another problem is to provide such a braking system that may be readily applied to any type of internal combustion engine without drastic modification of the engine itself. In the various control systems disclosed in the Cummins patent, extensive modification and reconstruction of an engine is necessary to make it possible for the engine to function as a brake. Any attempt to modify a conventional engine to provide such braking operations after the engine leaves the factory would involve extensive rebuilding of the engine.

A further problem is to provide a control system that is relatively simple and relatively inexpensive. The mechanisms disclosed in the Cummins patent are complicated with numerous working parts and are correspondingly expensive.

The present invention is directed to these various problems in the construction of a control system for converting an internal combustion engine to a braking operation wherein the braking operation is achieved by holding either the exhaust valves or the intake valves at least partially open.

SUMMARY OF THE INVENTION

In the present disclosure the invention is applied to an internal combustion engine that has two exhaust valves for each cylinder, both the exhaust valves being held partially open whenever it is desired to convert the engine to braking operation. In such an engine, both exhaust valves may be operated by a valve bridge that reciprocates on a fixed guide post, the valve bridge in turn being operated by a cam-actuated rocker arm.

The invention teaches that the valve bridge and the guide post on which it is slidingly mounted may be constructed to cooperate with each other to form a hydraulic chamber that expands when the valve bridge advances to open the exhaust valves and contracts when the valve bridge retracts to permit the two exhaust valves to be closed by the exhaust valve springs. For a braking operation it is merely necessary to trap hydraulic fluid in the hydraulic chamber to prevent complete retraction of the valve bridge and thereby prevent complete closing of the two exhaust valves.

In the preferred embodiment of the invention, the valve bridge forms a small cylinder that reciprocates with the valve head and the guide post forms a fixed piston that cooperates with the cylinder to form the required variable hydraulic chamber. A longitudinal supply passage through the fixed post supplies the cylinder with hydraulic fluid through a check valve whenever a braking operation is desired. In the course of the contraction of the cylinder, the piston closes a radial port to cause hydraulic fluid to be trapped in one end of the cylinder to carry out the braking operation. The braking operation is terminated by opening a release valve of the chamber, the release valve being incorporated in the stationary guide post.

The preferred embodiment of the invention is further characterized by the concept of making the release valve responsive to pressure in the supply passage, the release valve closing in response to rise in the pressure. In such an arrangement, placing the supply passage in communication with a pressurized source of hydraulic fluid results in automatic closing of the release valve to initiate braking operation of the engine. Subsequently, placing the supply passage in communication with a low pressure region causes the release valve to open to terminate the braking operation.

The features and advantages of the invention may be understood from the following detailed description and the accompanying drawings.

BRIEF DESCRIPTION OF THE DRAWINGS

In the drawings, which are to be regarded as merely illustrative:

FIG. 2 is a view similar to FIG. 1 showing the parts positioned to hold the exhaust valves partially open for braking operation by the engine;

FIG. 3 is an enlarged portion of FIG. 1, the parts being positioned to open the exhaust valves fully;

FIG. 4 is a view similar to FIG. 3, the parts being positioned to permit complete closing of the exhaust valves;

FIG. 5 is an enlargement of FIG. 2, the parts being positioned to hold the exhaust valves partially open for braking operation by the engine; and FIG. 6 is a diagram of a hydraulic system for carrying out the braking operation.

DESCRIPTION OF THE PREFERRED EMBODIMENT

Figure 1:
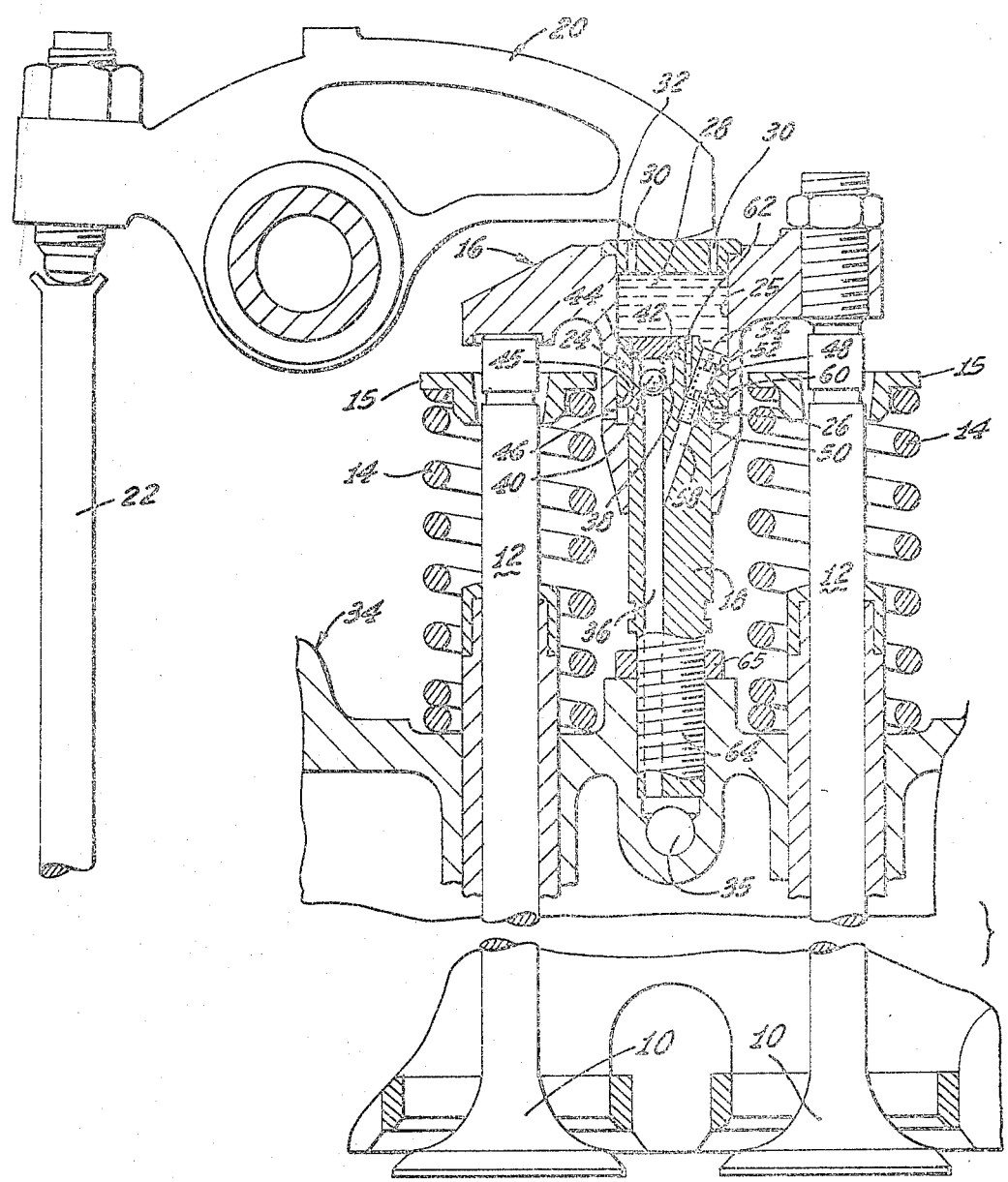
FIG. 1 is a view partly in side elevation and partly in section illustrating the presently preferred embodiment of my invention for controlling a pair of exhaust valves of a cylinder, the moving parts being positioned for normal operation of the engine for power output with the exhaust fully open.

Referring to FIG. 1, each cylinder of an internal combustion engine has a pair of exhaust valves 10 and has a similar pair of intake valves (not shown). Each of the exhaust valves has the usual stem 12 and is urged to its closed position by a corresponding valve spring 14 that backs against a collar 15 on the valve stem.

The upper ends of the two valve stems 12 abut the two arms respectively of a yoke or valve bridge 16 that is slidably mounted on the upper end of a fixed guide post 18. One end of a rocker arm 20 rocks against the valve bridge 16 and the other end is operatively connected in a well known manner to a push rod 22 that is actuated by a cam shaft (not shown).

In the normal operation of the engine for power output, the exhaust valves 10 of the various cylinders are opened in sequence by the corresponding rocker arms 20. To convert the engine to braking operation, the fuel supply is cut off and the various exhaust valves are maintained continuously in at least partially open positions for the duration of the braking period.

The rocker arm 20, the valve bridge 16 and the upper ends of the valve stems 12 constitute various means exterior of the cylinder that are operatively connected to the two exhaust valves 10 of the cylinder to reciprocate or oscillate with the reciprocations of the exhaust valves. The present invention teaches that for the purpose of carrying out a braking operation, a hydraulic chamber may be employed with a movable wall of the chamber operatively connected to any one of these exterior means for expansion of the chamber in response to opening of the exhaust valves and contraction of the chamber in response to closing of the exhaust valves.

In the present embodiment of the invention, the valve bridge 16 and the fixed guide post 18 cooperate to form the desired hydraulic chamber. For this purpose, the upper end of the fixed guide post 18 is enlarged to form a fixed piston 24 and the bore of the valve bridge 16 is enlarged to form a cylinder 25 that slidingly embraces the piston. The annular space 26 below the piston constitute the hydraulic chamber. The space 28 in the cylinder 25 above the fixed piston 24 is open to the atmosphere through bores 30 in a cap 32.

The cylinder head 34 of the engine forms a passage 35 along a row of cylinders for communication with a source of hydraulic fluid and branch passages to the various annular hydraulic chambers 26 are provided by longitudinal bores 36 in each of the fixed guide posts 18.

As best shown in FIG. 3, the upper end of each of the longitudinal bores 36 is enlarged to form a check valve chamber 38 in which a check valve ball 40 normally closes to longitudinal bore, the ball being urged to closed position by a coil spring 42 that backs against a removable plug 44. The check valve chamber 38 is in communication with the annular hydraulic chamber 26 through a diagonal bore 45. Thus the check valve chamber 38 and the diagonal bore 45 are in effect parts of the annular hydraulic chamber 26.

The annular hydraulic chamber 26 is provided with a radial port 46 to the atmosphere and is further provided with a suitable normally open release valve. In the construction shown, a diagonal bore 48 in the fixed guide post 18 serves as a release valve chamber for a release valve member 50 which is slidable between the normal open position shown in FIGS. 1 and 3 and a closed position shown in FIGS. 2 and 5. A suitable coil spring 52 acts in compression between the release valve member 50 and a plug 54 to bias the release valve member to its open position. At the closed position shown in FIG. 4, the release valve member abuts the plug 54.

The lower end of the release valve chamber 48 is in communication with the branch passage 36 by means of a bore 58. To provide the annular hydraulic chamber 26 with a release valve port, a diagonal bore 60 places the lower face of the piston 24 in communication with the release valve chamber 48 and a longitudinal bore 62 in the piston places the release valve chamber in communication with the space 28 above the piston.

At the open position of the release valve member 50 that is shown in FIGS. 1, 3 and 4, the two bores 60 and 62 constituting the release port place the annular hydraulic chamber 26 in communication with the space 28 for free communication with the atmosphere through the bores 30 in the cap 32. At the closed position of the release valve member 50 shown in FIGS. 2 and 5, the release valve member closes the two bores 60 and 62 to isolate the annular hydraulic chamber 26 from the upper space 28. The release valve member 50 is responsive to pressure in the branch passage 36 by virtue of the diagonal bore 58 so that elevated pressure in the branch passage forces the check valve member to its closed position in opposition to the spring 52.

Normally, i.e. when the engine is operating on its normal cycle to generate power, the passage 35 for hydraulic fluid is cut off from the high pressure source and is vented to a low pressure zone. Under these conditions, the check valve ball 40 is continuously in its closed position and the release valve member 50 is continuously in the open position as shown in FIGS. 1, 3 and 4.

Under normal conditions with the release valve member 50 at its open position because no hydraulic fluid is supplied to the branch passage 36, the expansion of the annular hydraulic chamber 26 by downward movement of the valve bridge 16 on the opening movement of the two exhaust valves 10, causes air to be drawn into the annular hydraulic chamber from the vented space 28 through the release passages 60 and 62 as well as through the radial port 46. When the hydraulic chamber 26 then contracts on the return upward movement of the valve bridge 16 air and any residual oil in the hydraulic chamber are expelled upward through the release passages 60 and 62 and initially air and residual oil are also expelled through the radial port 46. When the contraction of the hydraulic chamber reaches the point where the fixed piston 24 closes the radial port 46 the remaining fluid content of the hydraulic fluid is expelled solely through the release passages 60 and 62.

Whenever it is desired to hold the exhaust valves 10 at least partially open continuously to convert the operation of the engine to braking action, the passage 35 is placed in communication with a high pressure source of hydraulic fluid. The hydraulic fluid flows through the branch passages 36 to the various annular hydraulic chambers 26 and at the same time the rise in pressure in the branch passages 36 causes the corresponding release valve members 50 to be moved to their closed positions in opposition to the corresponding coil springs 52.

Under these conditions wherein pressurized hydraulic fluid is freely supplied to an annular hydraulic chamber 26 through a corresponding check valve, initial contraction of the annular chamber by the return upward movement of the valve bridge 16 results in hydraulic fluid being discharged to the atmosphere through the radial port 46. When the contraction of the annular hydraulic chamber 26 reaches the point where the fixed piston 24 closes the radial port 46 as shown in FIGS. 2 and 5, the remaining fluid in the hydraulic chamber is trapped because the release valve member 50 is at its closed position. Consequently the return upward movement of the valve bridge 16 is interrupted at this point to keep the two exhaust valves 10 from completely closing. Thus the annular hydraulic chamber 26 serves as a hydraulic lock to keep the exhaust valves 10 at least partially open continuously throughout a period of braking operation. Periodically the rocker arm 20 fully opens the exahust valves 10 during the braking operation but the timing of the fully opening of the exhaust valves does not interfere with the desired braking operation.

To terminate a braking period it is merely necessary to vent the passage 35 to a low pressure zone thereby to permit all of the release valve members 50 to return to their normal open positions.

If the engine is operating at high speed a contraction and expansion of an annular hydraulic chamber 26 may occur too rapidly to permit the desired quantity of pressurized fluid to flow into the annular hydraulic chamber during the reciprocation. The provision of a check valve, however, prevents reverse flow from the annular chamber and thus permits successive increments of hydraulic fluid to be injected into the annular chamber on successive reciprocations of the valve bridge until sufficient hydraulic fluid accumulates in the annular chamber to lock the exhaust valves hydraulically in partial open positions. Since the exhaust valves of the various cylinders operate in sequence, the annular hydraulic chambers become effective in sequence to hold the exhaust valves partially open and, of course, the particular sequence at which the hydraulic chambers become effective depends upon the point in the engine cycle at which the braking operation is initiated.

A feature of the invention is that the fixed guide post 18 may be adjusted vertically to determine the particular degree to which the corresponding exhaust valves 10 are held open by trapped hydraulic fluid. For this purpose, each of the guide posts 18 is formed with a screw thread 64 whereby the guide post is screwed into the cylinder head. A suitable lock nut 65 locks the guide post at a selected adjustment.

The required pressurized hydraulic fluid may be supplied and controlled in any suitable manner. In the preferred practice of the invention, the hydraulic fluid is lubricating oil taken from the crankcase of the engine.

FIG. 4 shows diagrammatically how a pump 70 may draw oil from the crankcase through a strainer 72, the output side of the pump being connected to a line 74 which has a branch 75 to a relief valve 76. The high pressure line 74 communicates with one port of a two position-three connection directional valve 78 that is operable by a solenoid 80 and is normally in the position shown at which it cuts off the high pressure line 74. A second port of the directional valve 78 is connected to the two fluid passages 35 that extend along two rows of the cylinders to supply fluid through the branch passages 36 to the various annular hydraulic chambers 26. At the normal position of the directional valve 78 the passages 35 are vented to a return line 82. When the solenoid 80 is energized, the directional valve 78 places the high pressure line 74 in communication with the two passages 35 to cause the engine to function as a brake.

The invention has been described as utilizing the exhaust valves for the braking operation. Obviously the same kind of mechanism can be applied to control of the intake valves.

My description in specific detail of the presently preferred embodiment of the invention will suggest various changes, substitutions and other departures from my disclosure.

I claim:
1. In an internal combustion engine wherein either an exhaust valve or an intake valve of a cylinder of the engine is biased to closed position and in the normal operation of the engine is periodically forced to open position and wherein means exterior of the cylinder is operatively connected to the valve to advance when the valve opens and to retract when the valve closes,
the combination therewith of means to cause the valve to stay at least partially open to retard the engine for braking operation,
said causing means comprising:
a variable chamber operatively connected to said exterior means for expansion in response to advance of the exterior means and contraction in response to retraction of the exterior means, said chamber being normally open to permit free to flow of fluid therefrom when the chamber contracts; and
means to supply hydraulic fluid to the chamber and to close the chamber to trap the fluid in the chamber to prevent complete contraction of the chamber thereby to prevent complete closing of the valve throughout a braking period.

2. A combination as set forth in claim 1 which includes a release port for the chamber and a passage to supply hydraulic fluid under pressure to the chamber;
and which includes means to close the release port in response to rise in the pressure in the passage,
whereby supplying pressurized hydraulic fluid to the chamber through the passage results in closing the release port.

3. In an internal combustion engine wherein either an exhaust valve or an intake valve of a cylinder of the engine is biased to closed position and in the normal operation of the engine is periodically forced to open position and wherein means exterior of the cylinder is operatively connected to the valve to advance when the valve opens and to retract when the valve closes, the combination therewith of means to cause the valve to stay continuously at least partially open throughout at least partially open throughout a braking period,
said causing means comprising:
a chamber having a movable wall operatively connected to said exterior means for expansion of the chamber in response to advance of the exterior means and contraction of the chamber in response to retraction of the exterior means during normal operation of the engine for power output, said chamber being normally open to permit free flow of fluid therefrom when the chamber contracts in the normal operation of the engine;
means including a passage to the chamber to supply hydraulic fluid under pressure to the chamber; and
a release valve in communication with said chamber normally releasing fluid therefrom thereby to prevent trapping of fluid in the chamber,
said release valve being responsive to pressure in said passage to close in response to rise in the pressure to cause hydraulic fluid to be trapped in the chamber to prevent complete contraction of the chamber thereby to prevent complete closing of the valve of the cylinder.

4. In an internal combustion engine wherein either an exhaust valve or an intake valve of a cylinder is biased to closed position and in the normal operation of the engine is periodically forced to open position and wherein means exterior of the cylinder is operatively connected to the valve for periodic advance and retraction in response to periodic opening and closing of the valve,
the combination therewith of means to cause the valve to stay at least partially open continuously through a period in which the engine functions as a brake,
said causing means comprising:
a chamber having a movable wall operatively connected to said exterior means for expansion of the chamber in response to periodic opening of the valve and contraction of the chamber in response to periodic closing of the valve when the engine is operating normally for power output; and means operable to trap fluid in said chamber to interfere with contraction of the chamber thereby to prevent complete closing of the valve.

5. A combination as set forth in claim 4 in which said chamber is defined by a cylinder and a piston therein, one of said cylinder and said piston being operable by the periodic advance and retraction of said exterior means during the normal operation of the engine for power output, the other of said cylinder and said piston being fixed, said cylinder having a radial port spaced from one end of the cylinder to be cut off by the piston in the course of the contraction of the chamber, said cylinder having a release port in communication with said end of the cylinder with a release valve controlling the release port, whereby with said chamber in communication with a source of hydraulic fluid and with said release port closed, said piston closes the radial port to trap hydraulic fluid in the chamber to prevent complete contraction of the chamber and thereby prevent complete closing of the valve of the cylinder to initiate a braking period, and whereby the release port may be subsequently opened to permit full contraction of the hydraulic chamber to terminate the braking period.

6. A combination as set forth in claim 5 wherein said valve of the cylinder is operated by a valve bridge that is slidingly mounted on a fixed guide post, the valve bridge in turn being operated by a cam-actuated rocker arm; and wherein said hydraulic chamber is formed in part by the valve bridge and in part by the guide post for contraction and expansion in response to reciprocation of the valve of the engine.

7. A combination as set forth in claim 6 which includes a passage in said guide post to supply pressurized hydraulic fluid to the chamber.

8. A combination as set forth in claim 7 in which said release valve is responsive to pressure in said passage to close in response to rise in the pressure, whereby supplying pressurized hydraulic fluid to the chamber through said passage results in closing of the release valve.

9. A combination as set forth in claim 6 in which said release port and release valve are in the guide post.

10. A combination as set forth in claim 6 wherein said fixed post is adjustable up and down to adjust the degree to which the valve of the cylinder is held open during a braking period.

References Cited

UNITED STATES PATENTS

| | | | |
|---|---|---|---|
| 2,002,196 | 5/1935 | Ucko | 123—97 |
| 3,220,393 | 11/1965 | Cummins | 123—97 |
| 3,332,405 | 7/1967 | Haviland | 123—97 |
| 3,367,312 | 2/1968 | Jonsson | 123—97 |
| 3,405,699 | 10/1968 | Laas | 123—97 |
| 3,439,662 | 4/1969 | Jones et al. | 123—97 |

WENDELL E. BURNS, Primary Examiner

U.S. Cl. X.R.

123—105, 109, 111, 198